US008837010B2

(12) United States Patent  
Takahashi

(10) Patent No.: US 8,837,010 B2
(45) Date of Patent: Sep. 16, 2014

(54) IMAGE FORMING APPARATUS

(71) Applicant: KYOCERA Document Solutions Inc., Osaka (JP)

(72) Inventor: Satoru Takahashi, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/793,460

(22) Filed: Mar. 11, 2013

(65) Prior Publication Data

US 2013/0242357 A1  Sep. 19, 2013

(30) Foreign Application Priority Data

Mar. 14, 2012 (JP) ................................. 2012-056985

(51) Int. Cl.
  *H04N 1/04* (2006.01)
  *H04N 1/00* (2006.01)
  *G03G 21/16* (2006.01)
  *G03G 15/00* (2006.01)

(52) U.S. Cl.
  CPC ....... *H04N 1/00559* (2013.01); *G03G 21/1647* (2013.01); *G03G 15/605* (2013.01)
  USPC ............ 358/474; 358/498; 358/497; 358/496

(58) Field of Classification Search
  USPC .................. 358/474, 498, 497, 496
  See application file for complete search history.

(56) References Cited

U.S. PATENT DOCUMENTS

| 8,570,624 | B2 * | 10/2013 | Nagashima | ................... 358/498 |
| 2002/0061212 | A1 | 5/2002 | Tanaka | |
| 2008/0145098 | A1 | 6/2008 | Ito | |
| 2008/0152122 | A1 | 6/2008 | Idan et al. | |
| 2008/0310898 | A1 * | 12/2008 | Jo et al. | ......................... 399/367 |
| 2008/0317498 | A1 | 12/2008 | Andoh et al. | |
| 2009/0300878 | A1 | 12/2009 | Suzuki | |
| 2010/0238524 | A1 | 9/2010 | Yang et al. | |
| 2011/0102938 | A1 | 5/2011 | Bates et al. | |
| 2011/0102983 | A1 | 5/2011 | Souda et al. | |
| 2013/0322917 | A1 | 12/2013 | Souda et al. | |

FOREIGN PATENT DOCUMENTS

| JP | 2004112575 | 4/2004 |
| JP | 2008152122 | 7/2008 |
| JP | 2009-31730 | 2/2009 |
| JP | 2010008967 | 1/2010 |
| JP | 2011237670 | 11/2011 |

OTHER PUBLICATIONS

Japanese Office Action.

* cited by examiner

*Primary Examiner* — Houshang Safaipour
(74) *Attorney, Agent, or Firm* — Gerald E. Hespos; Michael J. Porco; Matthew T. Hespos

(57) ABSTRACT

An image forming apparatus includes: a housing, an image reading section, shaft sections, bearing sections, abutment sections, and abutting sections. The housing is provided with an upper surface section. The image reading section has a first wall, a second wall, a bottom surface and a platen. The image reading section is mounted on the upper surface section of the housing. The shaft sections are installed at the bottom surface and provided with a rotating shaft. The bearing sections are provided at the upper surface section of the housing and the shaft sections are inserted into the bearing sections. The abutment sections are disposed at the upper surface section and arranged to face the bottom surface of the image reading section. The abutting sections are disposed at the bottom surface and are caused by the weight of the image reading section to abut against the abutment sections.

7 Claims, 12 Drawing Sheets

IMAGE FORMING APPARATUS

This application is based on Japanese Patent Application No. 2012-056985 filed in the Japan Patent Office on Mar. 14, 2012, and the contents thereof are incorporated herein by reference.

BACKGROUND

The present disclosure relates to an image forming apparatus performing image formation processing on a sheet.

An image reading unit is disposed in an image forming apparatus such as a copier, an all-in-one machine, and a printer. In the image reading unit, a document is irradiated with light from a light source, the reflected light is photoelectrically converted by an image reading sensor, and image data are outputted as an electric signal. The image reading unit is provided with a platen for placing the document thereon. The platen is constituted by a transparent glass or the like, and the image of the document placed on the platen is read by the image reading sensor through the platen. In the conventional apparatus, an image forming unit that forms a toner image on a sheet according to the document image is provided together with the image reading unit in the main body of the image forming apparatus. The image reading unit is mounted above the apparatus main body.

In the abovementioned conventional apparatus, the image reading unit is fixed to the apparatus main body to prevent the image reading unit from being lifted from the apparatus main body. Where such an apparatus is disposed on a floor, when distortion occurs in the apparatus main body due to concave and convex portions present on the floor surface, distortion also occurs in the image reading unit disposed above the apparatus main body. In this case, distortion occurs in the document image that is read by the image reading sensor.

The present disclosure has been created to resolve the above-described problem, and it is an object of the present disclosure to prevent the occurrence of strains in the image reading unit disposed above the apparatus main body.

SUMMARY

An image forming apparatus according to one aspect of the present disclosure includes: a housing, an image forming unit, an image reading section, shaft sections, bearing sections, abutment sections, and abutting sections. The housing is provided with an upper surface section. The image forming unit is provided inside the housing and forms an image on a sheet. The image reading section has a first wall, a second wall on a side opposite to the first wall, a bottom surface connecting the first wall and the second wall, and a platen for placing a document. The image reading section is mounted on the upper surface section of the housing and reads the document image of the document. The shaft sections are installed at the bottom surface of the image reading section or the upper surface section of the housing and provided with a rotating shaft that extends in a direction along the first wall. The bearing sections are provided at a surface, from among the bottom surface of the image reading section and the upper surface section of the housing, other than a surface where the shaft sections are provided, and the shaft sections are inserted into the bearing sections. The bearing sections support the shaft sections so that the image reading section can be rotated with respect to the upper surface section of the housing. The abutment sections are disposed at the upper surface section of the housing on a side closer to the second wall than the shaft sections or the bearing sections and arranged to face the bottom surface of the image reading section. The abutting sections are disposed at the bottom surface of the image reading section on a side closer to the second wall than the shaft sections or the bearing sections and are caused by the weight of the image reading section to abut against the abutment sections.

DETAILED DESCRIPTION

Figure 1:
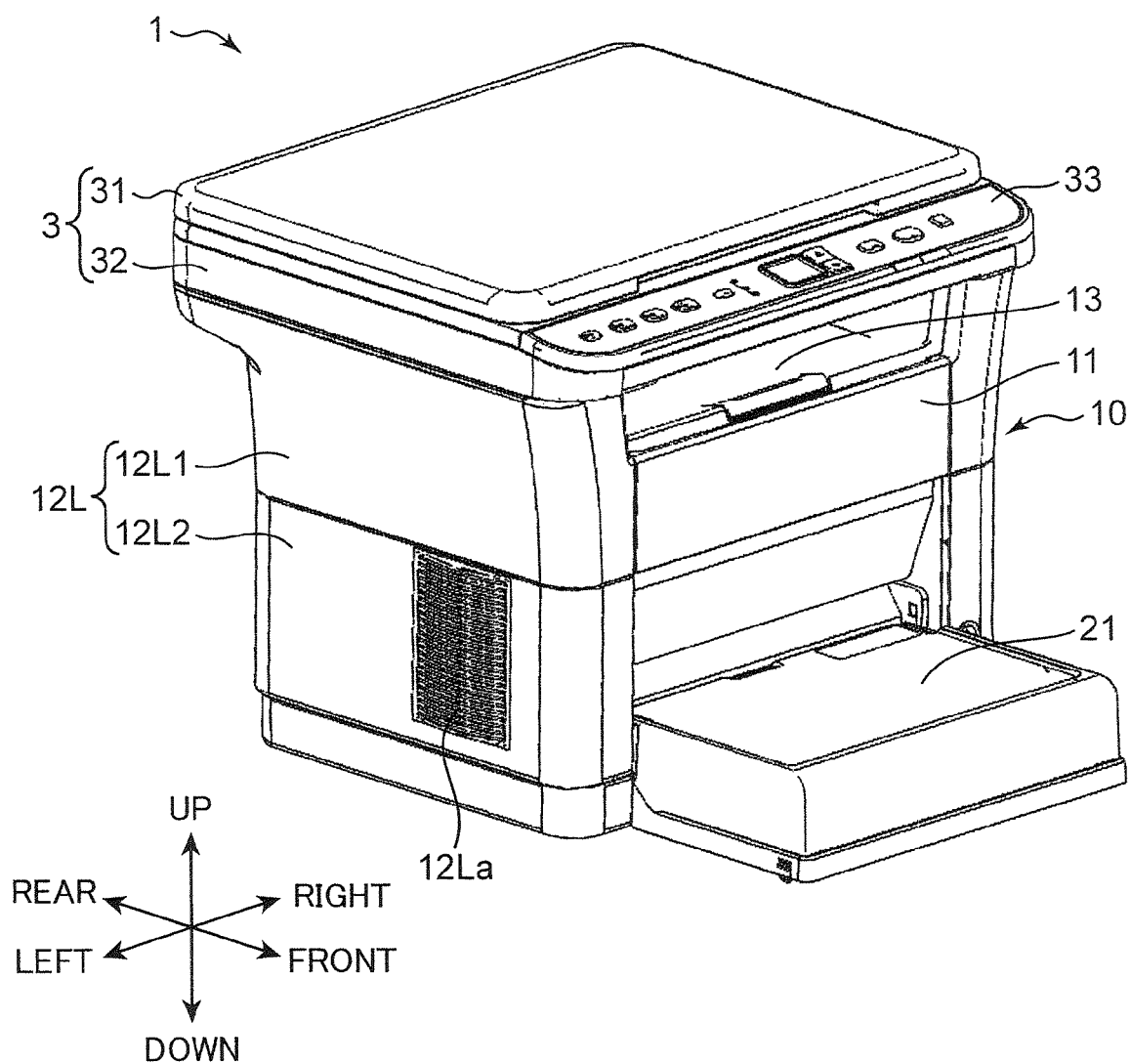
FIG. 1 is a perspective view illustrating the external appearance of an image forming apparatus according to an embodiment of the present disclosure.
Figure 2:
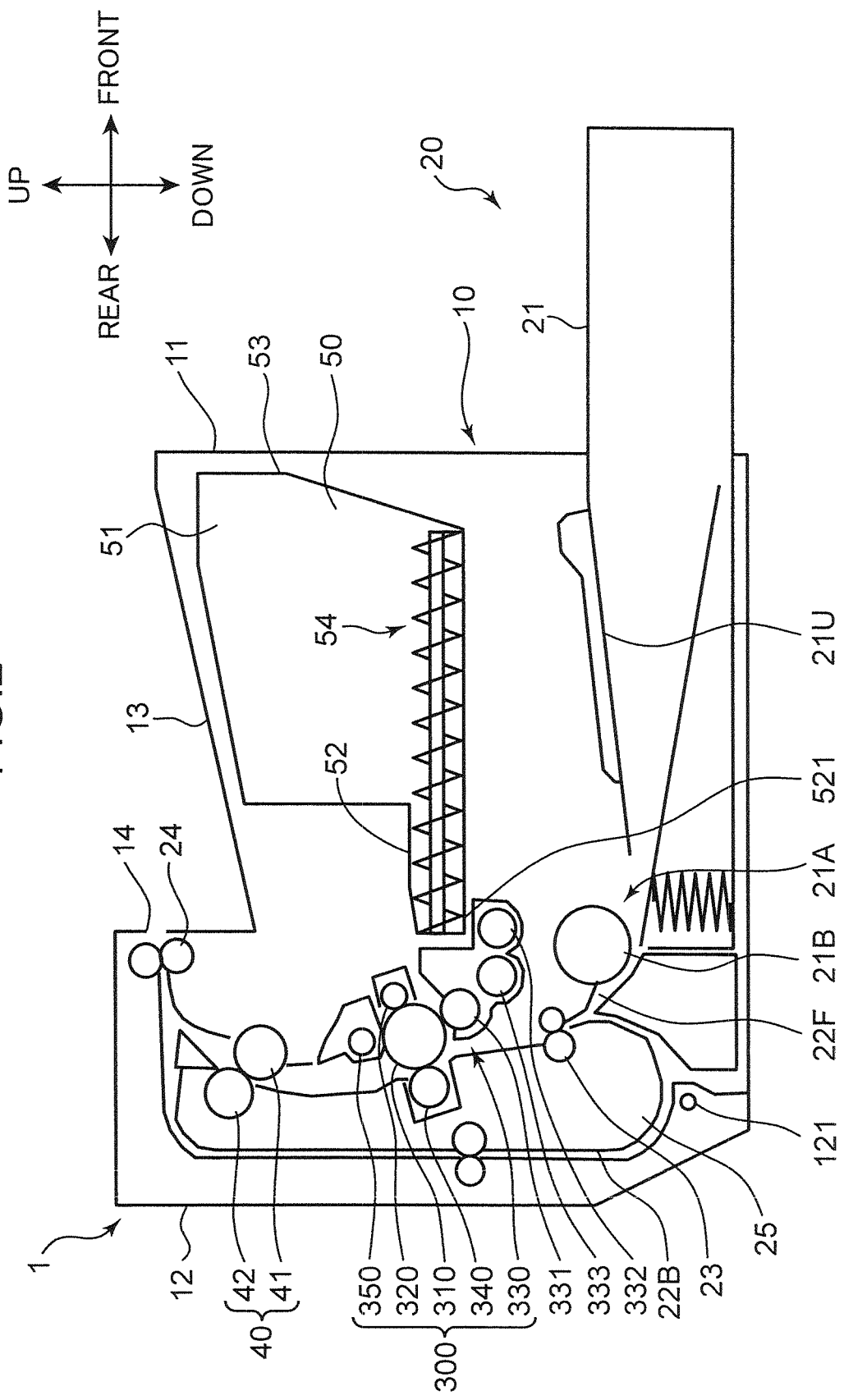
FIG. 2 is a cross-sectional view illustrating the inner structure of the main body portion of the image forming apparatus according to the embodiment of the present disclosure.

An embodiment of the present disclosure will be described below in greater detail. FIG. 1 is a perspective view illustrating the external appearance of an image forming apparatus 1 according to an embodiment of the present disclosure. FIG. 2 is a side sectional view illustrating the internal structure of the main body portion of the image forming apparatus 1. The image forming apparatus 1 is assembled by attaching the reading unit 3 above a main body housing 10. In the present embodiment, the image forming apparatus 1 corresponds to an image forming apparatus of the so-called in-body paper discharge type. A monochrome printer is an example of the image forming apparatus 1, but the image forming apparatus may also be a copier, a facsimile device, or an all-in-one device provided with the functions thereof. It may also be an image forming apparatus forming color images.

The image forming apparatus 1 includes the main body housing 10 (housing) having a housing structure in a substantially rectangular parallelepiped shape, a paper feeder 20, an image forming unit 300, a fixing unit 40, a toner container 50, and a reading unit 3 accommodated inside the main body housing 10.

A front cover 11 and a rear cover 12 are provided on the front surface side and rear surface side, respectively, of the main body housing 10. The toner container 50 is exposed on the front side when the front cover 11 is opened. As a result, the user can remove the toner container 50 from the front surface side of the main body housing 10 when the toner is spent. The rear cover 12 is opened in the case of a sheet jam and for maintenance. The image forming unit 300 and the fixing unit 40 can be removed from the rear surface side of the main body housing 10 by opening the rear cover 12. A left cover 12L (FIG. 1) and a right cover 12R (not shown in FIG. 1) located on the side opposite to the left cover 12L are provided so as to extend in the vertical direction on the side surfaces of the main body housing 10. The left cover 12L can be divided in the vertical direction and configured of an upper cover section 12L1 and a lower cover section 12L2. An air intake port 12La for taking the air into the main body housing 10 is provided on the front side portion of the lower cover section 12L2. A paper discharge unit 13 that discharges the sheets after image formation (sheets subjected to fixing) is provided on the upper surface (below the reading unit 3) of the main body housing 10. Various devices for executing image formation are installed in an inner space S (see FIG. 3) defined by the front cover 11, rear cover 12, left cover 12L, right cover 12R, and paper discharge unit 13.

The paper feeder 20 includes a paper feed cassette 21 that houses sheets on which images are to be formed (FIG. 2). Part of the paper feed cassette 21 further protrudes forward from the front surface of the main body housing 10. The upper surface of the portion of the paper feed cassette 21 that is housed inside the main body housing 10 is covered by a paper feed cassette top plate 21U. A sheet housing space where a stack of the sheets is accommodated and a lift plate that lifts up the stack of sheets for feeding are provided in the paper feed cassette 21. A sheet send-out unit 21A is provided in the upper section on the rear end side of the paper feed cassette 21. A paper feed roller 21B for sending out one by one the uppermost sheets of the sheet stack inside the paper feed cassette 21 is disposed in the sheet send-out unit 21A.

The image forming unit 300 performs image forming processing for forming a toner image on the sheet that is fed out from the paper feeder 20. The image forming unit 300 includes a photosensitive drum 310 (image carrier) and also an electrostatic charging device 320, an exposure device (not shown in FIG. 3), a development device 330, a transfer roller 340, and a cleaning device 350 disposed around the photosensitive drum 310. The image forming unit 300 is provided between the left cover 12L and the right cover 12R.

The photosensitive drum 310 rotates about the axis thereof, and an electrostatic latent image and a toner image are formed on the circumferential surface thereof. A photosensitive drum using an amorphous silicon (a-Si) material can be used as the photosensitive drum 310. The electrostatic charging device 320 includes an electrostatic charging roller that uniformly charges the surface of the photosensitive drum 310 and comes into contact with the photosensitive drum 310. The cleaning device 350 has a cleaning blade or the like, scrapes out the toner that has adhered to the circumferential surface of the photosensitive drum 310 after the toner image transfer and also transports the toner to a recovery device (not shown in the figure).

The exposure device has a laser light source and an optical device such as a mirror or a lens. By the exposure device, the circumferential surface of the photosensitive drum 310 is irradiated with a laser beam modulated on the basis of image data provided from an external device such as a personal computer, and an electrostatic latent image is formed. The development device 330 supplies toner to the circumferential surface of the photosensitive drum 310 in order to develop the electrostatic latent image on the photosensitive drum 310 and form a toner image. The development device 330 includes a development roller 331 that carries the toner supplied to the photosensitive drum 310 and a first conveying screw 332 and a second conveying screw 333 that convey a developer in a circulation manner, while stirring the developer inside a development housing (not shown in the figure).

The transfer roller 340 serves for transferring the toner image formed on the circumferential surface of the photosensitive drum 310 onto a sheet and forms a transfer nip section with the photosensitive drum 310. A transfer bias of a polarity opposite that of the toner is applied to the transfer roller 340.

The fixing unit 40 performs the processing of fixing the transferred toner image on the sheet. The fixing unit 40 has a fixing roller 41 having a heating source provided inside thereof and a pressurizing roller 42 that is pressed against the fixing roller 41 and forms a fixing nip section with the fixing roller 41. Where the sheet with the toner image transferred thereto passes through the fixing nip section, the toner image is fixed on the sheet by heating performed by the fixing roller 41 and pressure applied by the pressurizing roller 42.

The toner container 50 stores the toner to be supplied to the development device 330. The toner container 50 includes a container main body 51 serving as a main storage location for the toner, a tubular section 52 protruding from the lower portion on one side surface of the container main body 51, a lid member 53 that covers the other side surface of the container main body 51, and a rotating member 54 that is accommodated inside the container and conveys the toner. The toner stored inside the toner container 50 is supplied from a toner discharge port 521 provided in the lower surface at a distal end of the tubular body 52 into the development device 330 by rotationally driving the rotating member 54. The toner container 50 is positioned below the paper discharge unit 13 (see FIG. 2).

A main conveying path 22F and a reverse conveying path 22B are provided inside the main body housing 10 for conveying the sheets. The main conveying path 22F extends from the sheet send-out unit 21A of the paper feeder 20 to a paper discharge port 14 provided to face the paper discharge unit 13 on the upper surface of the main body housing 10 via the image forming unit 300 and the fixing unit 40. When two-side printing is performed on the sheet, the reverse conveying path 22B is used for returning the sheet printed on one side to the upstream side of the image forming unit 300 in the main conveying path 22F.

A resist roller pair 23 is disposed in the main conveying path 22F on the upstream side of the transfer nip section formed by the photosensitive drum 310 and the transfer roller 340. The sheet is temporarily stopped at the resist roller pair 23, skew correction is performed, and the sheet is then fed out to the transfer nip section at a predetermined timing for image transfer. A plurality of conveying rollers for conveying the sheets is arranged in the main conveying path 22F and the reference conveying path 22B. For example, a paper discharge roller pair 24 is disposed in the vicinity of the paper discharge port 14.

The reverse conveying path 22B is formed between the outer side surface of a reverse unit 25 and the inner surface of the rear cover 12 of the main body housing 10. The transfer roller 340 and one roller of the resist roller pair 23 are attached at the inner side surface of the reverse unit 25. The rear cover 12 and the reverse unit 25 can rotate about the axis of a fulcrum section 121 provided at the lower end thereof. The rear cover 12 is opened when a sheet jam occurs in the reverse conveying path 22B. When a sheet jam occurs in the main conveying path 22F, or when the unit of the photosensitive drum 310 or the development device 330 is taken out to the outside, the reverse unit 25 is also opened in addition to the rear cover 12.

Figure 3:
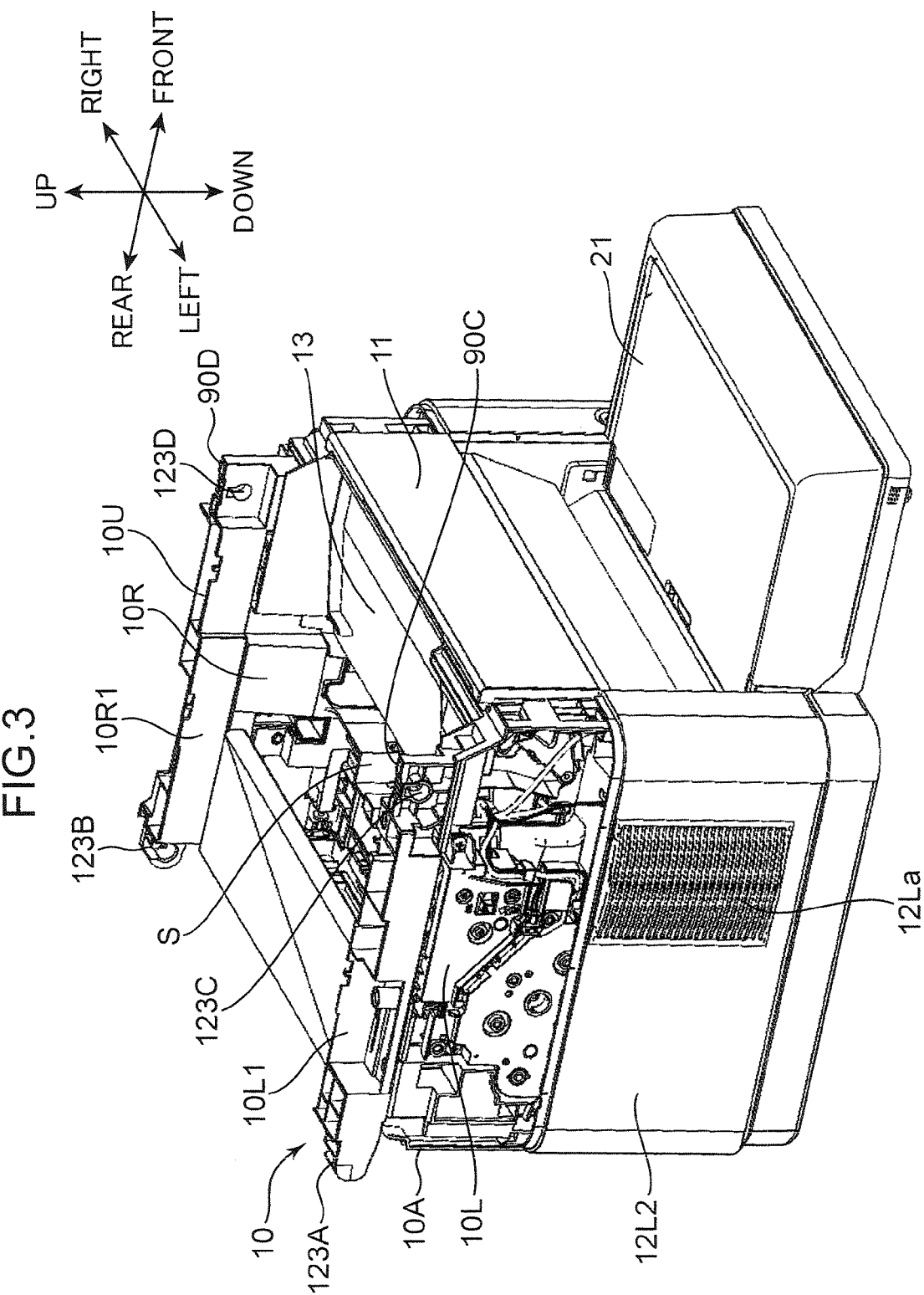
FIG. 3 is a perspective view, from above, of the main body housing according to the embodiment of the present disclosure.
Figure 4:
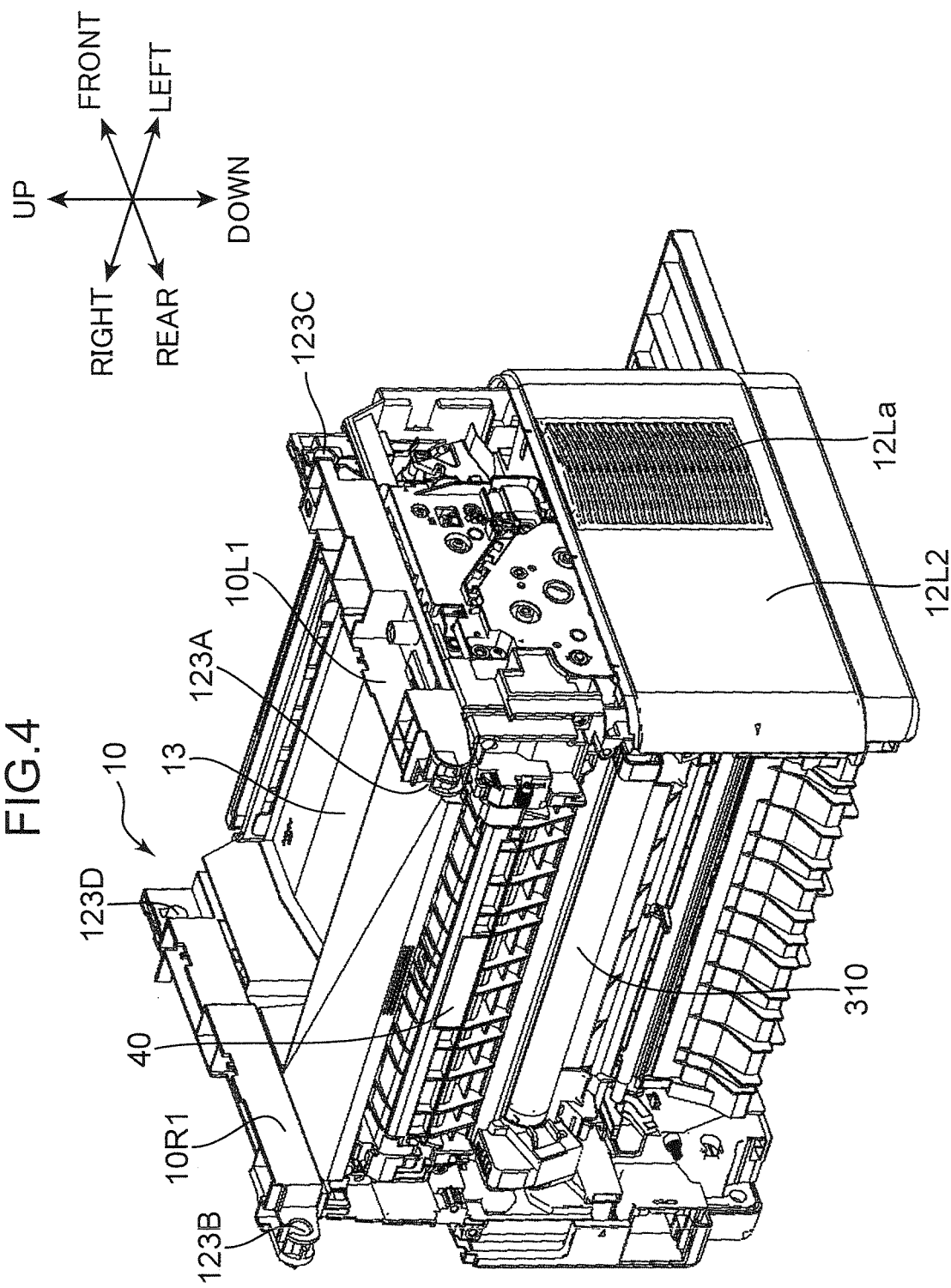
FIG. 4 is a perspective view, from behind, of the main body housing according to the embodiment of the present disclosure.

The structure of the main body housing 10 will be explained below in the greater detail with reference to FIGS. 3 and 4. FIG. 3 is a perspective view in which the main body housing 10 is viewed from the front and above. FIG. 3 shows the state of the configuration shown in FIG. 1 in which the reading unit 3, upper cover section 12L1 and the image forming unit 300 (FIG. 2) are taken out. FIG. 4 is a perspective view in which the main body housing 10 shown in FIG. 3 is viewed from behind. FIG. 4 shows a state in which the rear cover 12 and the reverse unit 25 (FIG. 2) are taken out.

Referring to FIG. 3, the main body housing 10 is provided with a main body frame 10A that is exposed when the front cover 11, rear cover 12, left cover 12L, and right cover 12R are taken out. The main body frame 10A is a skeleton portion of the image forming device 1 having a box-like shape. The main body frame 10A is constituted by a flameproof resin material.

The main body frame 10A is provided with a left frame 10L and a right frame 10R. The left frame 10L support various devices on the left cover 12L side of the main body frame 10A. The right frame 10R supports various devices on the right cover 12R side of the main body frame 10A. The image forming unit 300 and the fixing unit 40 (FIG. 2) extending in the left-right direction are supported by the left frame 10L and the right frame 10R. The main body housing 10 is also provided with an upper surface section 10U. The below-described reading unit 3 is mounted on the upper surface section 10U.

A left fixing frame 10L1 is disposed in the upper portion of the left frame 10L. The left fixing frame 10L1 is provided to extend in the front-rear direction and configured integrally with the left frame 10L. A right fixing frame 10R1 is disposed in the upper portion of the right frame 10R. The right fixing frame 10R1 is provided to extend in the front-rear direction and configured integrally with the right frame 10R. The upper surface section 10U is constituted by the left fixing frame 10L1 and the right fixing frame 10R1.

A first bearing section 123A (shaft support section) is disposed in the rear portion of the left fixing frame 10L1. The first bearing section 123A has a substantially cylindrical shape. A first fixing section 123C is disposed in the front portion of the left fixing frame 10L1 and at one end side, in the direction along the below-described reading section rear wall 32D, of the upper surface section 10U of the main body housing 10. The first fixing section 123C is disposed in front of the first bearing section 123A. Further, the first fixing section 123C is disposed in the upper surface section 10U of the main body housing 10 closer to the reading section front wall 32A of the below-described reading unit 3 than the first bearing section 123A. The first fixing section 123C is a plate-shaped member extending in the front-rear direction and has a hole passing through in the left-right direction.

Likewise, a second bearing section 123B (shaft support section) is disposed in the rear portion of the right fixing frame 10R1. The second bearing section 123B has a substantially cylindrical shape. A second fixing section 123D is disposed in the front portion of the right fixing frame 10R1 and at other end side, in the direction along the below-described reading section rear wall 32D, of the upper surface section 10U of the main body housing 10. The second fixing section 123D is disposed in front of the second bearing section 123B. Further, the second fixing section 123D is disposed in the upper surface section 10U of the main body housing 10 closer to the reading section front wall 32A of the below-described reading unit 3 than the second bearing unit 123B. The second fixing section 123D is a plate-shaped member extending in the front-rear direction and has a hole passing through in the left-right direction.

The first bearing section 123A, second bearing unit 123B, first fixing section 123C, and second fixing section 123D function as connection sections when the reading unit 3 is mounted on the main body housing 10. The connection structures thereof will be explained below in greater detail.

The reading unit 3 will be explained below with reference to FIGS. 1 and 5. The reading unit 3 is mounted on the upper surface section (upper side) of the main body housing 10. The reading unit 3 is constituted by a document pressing section and a reading section 32. A control section 33 (FIG. 1) is disposed in the front portion of the reading section 32.

The document pressing section 31 can assume an open posture and a closed posture, in the up-down direction, with respect to the reading section 32. Thus, when the reading section is fixed to the main body housing 10, the document pressing section 31 can be opened upward around a rotating shaft (not shown in the figure) disposed at the rear end. The document pressing section 31 has a function of pressing, from above, the document placed on the reading section 32.

The reading section 32 is disposed in the lower portion of the reading unit 3. A platen 550 (see FIG. 12) is disposed at a position facing the document pressing section 31 on the upper surface of the reading section 32. The document is placed by the user on the platen 550. A reading mechanism (not shown in the figure) is disposed inside the reading section 32. A light source and an image reading sensor (not shown in the figure) are disposed in the reading mechanism. The document is irradiated with light from the light source, the reflected light thereof is photoelectrically converted by the image reading sensor, and image data are outputted as an electric signal. The electric signal of the image data is sent to the exposure device, and an electrostatic latent image is formed on the photosensitive drum 310. The control section 33 is disposed such as to protrude forward from the reading section 32. A control panel or control buttons for the user to perform control are disposed on the upper surface of the control section 33.

Figure 5:
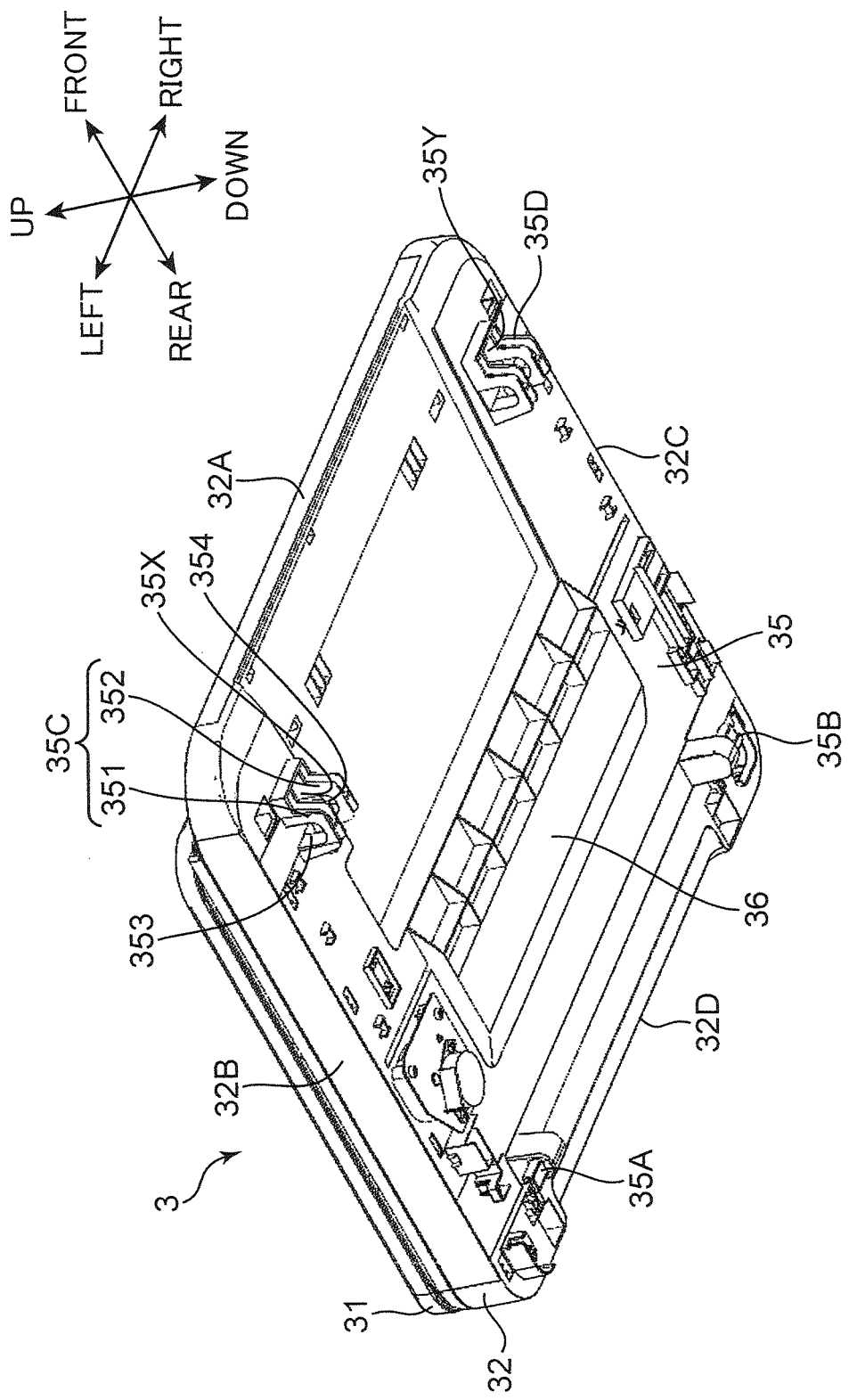
FIG. 5 is a perspective view, from below, of the reading unit according to the embodiment of the present disclosure.

Referring to FIG. 5, the reading section 32 of the reading unit 3 is provided with a lower surface section 35 (bottom surface) which is a bottom surface of a substantially rectangular shape, the reading section front wall 32A (second wall), a reading section left wall 32B, a reading section right wall 32C, and a reading section rear wall 32D (first wall) provided to rise upward from four sides of the lower surface section 35. The reading section front wall 32A is disposed on a side opposite to the reading section rear wall 32D. The lower surface section 35 connects the reading section rear wall 32D and the reading section front wall 32A. A downward bulging section 36 that is formed by causing a part of the lower surface section 35 to bulge downward is disposed in the central portion of the lower surface section 35. A plurality of ribs is disposed in the left-right direction in front of the downward bulging section 36. The downward bulging section 36 and the ribs increase the rigidity of the lower surface section 35. Further, the platen 550 is disposed above the lower surface section 35.

A first insertion section 35C and a second insertion section 35D are disposed close to the reading section left wall 32B and the reading section right wall 32C in the front portion of the lower surface section 35. The first insertion section 35C is provided with a pair of protruding pieces, namely, a first protruding piece 351 (first protruding section) and a second protruding piece 352 (third protruding section). The first protruding piece 351 and the second protruding piece 352 are provided to protrude downward (toward the upper surface section 10U of the main body housing 10) from the lower surface section 35 on a side closer to the reading section front wall 32A than the below-described first shaft section 35A. The first protruding piece 351 and the second protruding piece 352 are disposed in a spacing in the left-right direction. A first opening 353 and a second opening 354 are formed in the first protruding piece 351 and the second protruding piece 352, respectively. The first opening 353 and the second opening 354 are holes formed to pass through in the left-right direction (in a direction along the lower surface section 35) in the first protruding piece 351 and the second protruding piece 352. Further, a first abutting section 35X is disposed between the first protruding piece 351 and the second protruding piece 352. The first abutting section 35X is disposed flush with the lower surface section 35. The first abutting section 35X is disposed in the lower surface section 35 closer to the reading section front wall 32A than the below-described first shaft section 35A. The first abutting section 35X is disposed at one end side, in the direction along the reading section rear wall 32D, of the lower surface section 35. The first abutting section 35X is brought by the weight of the reading unit 3 into contact with a first abutment section 90C (FIG. 9) of the left fixing frame 10L1 of the below-described main body frame 10A. The second insertion section 35D is provided with the shape same as that of the first insertion section 35C. A second abutting section 35Y (FIG. 5) corresponding to the first abutting section 35X of the first insertion section 35C is disposed at the second insertion section 35D. The second abutting section 35Y is disposed at other end side, in the direction along the reading section rear wall 32D, of the lower surface section 35.

The first shaft section 35A (shaft section) and a second shaft section 35B are disposed close to the inner sides of the reading section left wall 32B and the reading section right wall 32C, respectively, in the rear end section of the lower surface section 35. The first shaft section 35A is disposed at one end side (left side) of the reading section rear wall 32D, and the second shaft section 35B is disposed at the other end side (right side) of the reading section rear wall 32D. The first shaft section 35A and the second shaft section 35B each has a shaft-like shape (rotating shaft) extending outward in the left-right direction along the reading section rear wall 32D. The above-described first insertion section 35C and the second insertion section 35D are disposed in the lower surface section 35 closer to the reading section front wall 32A than the first shaft section 35A and the second shaft section 35B.

Figure 6:
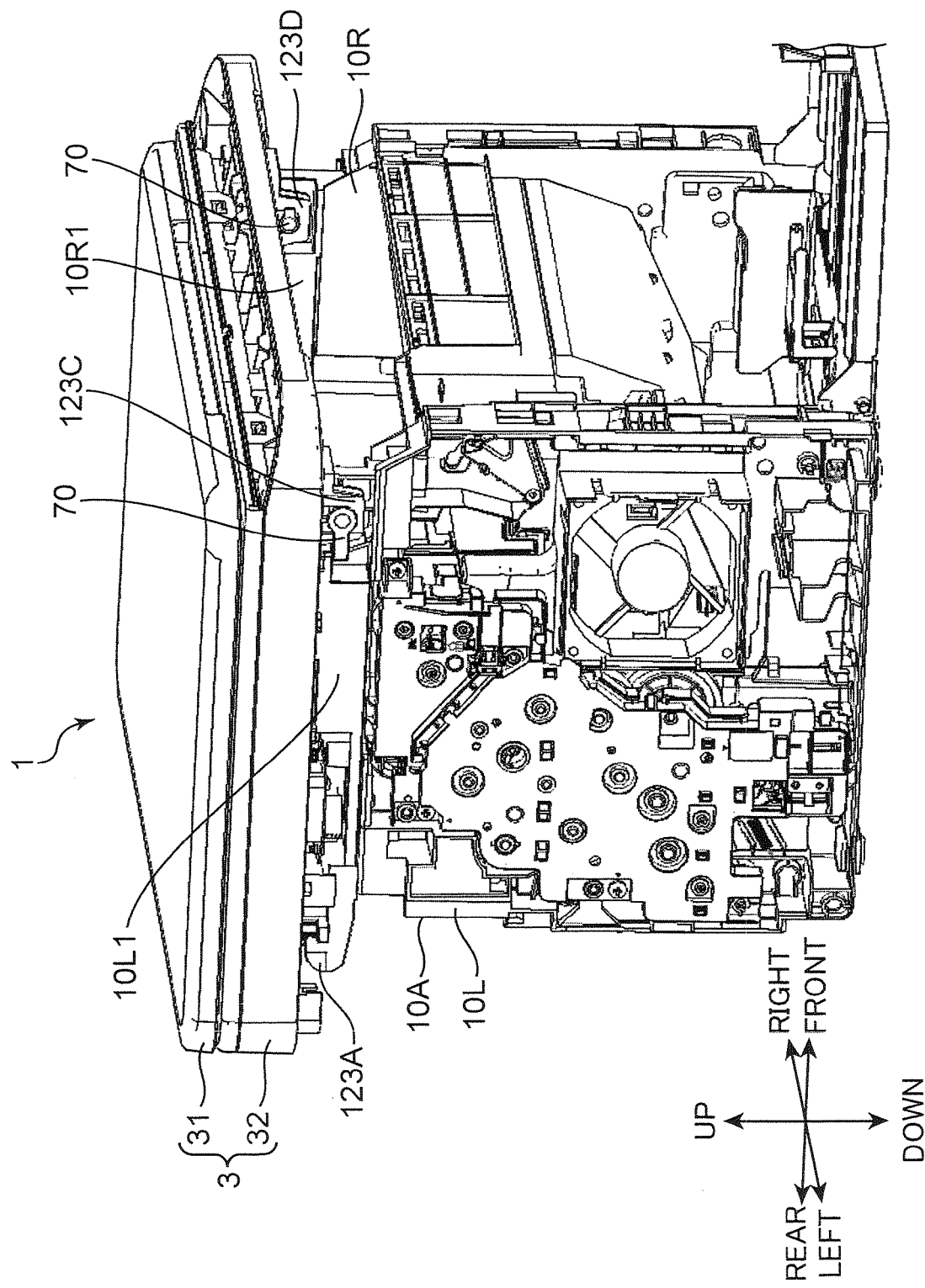
FIG. 6 is a perspective view of the image forming apparatus according to the embodiment of the present disclosure.
Figure 7:
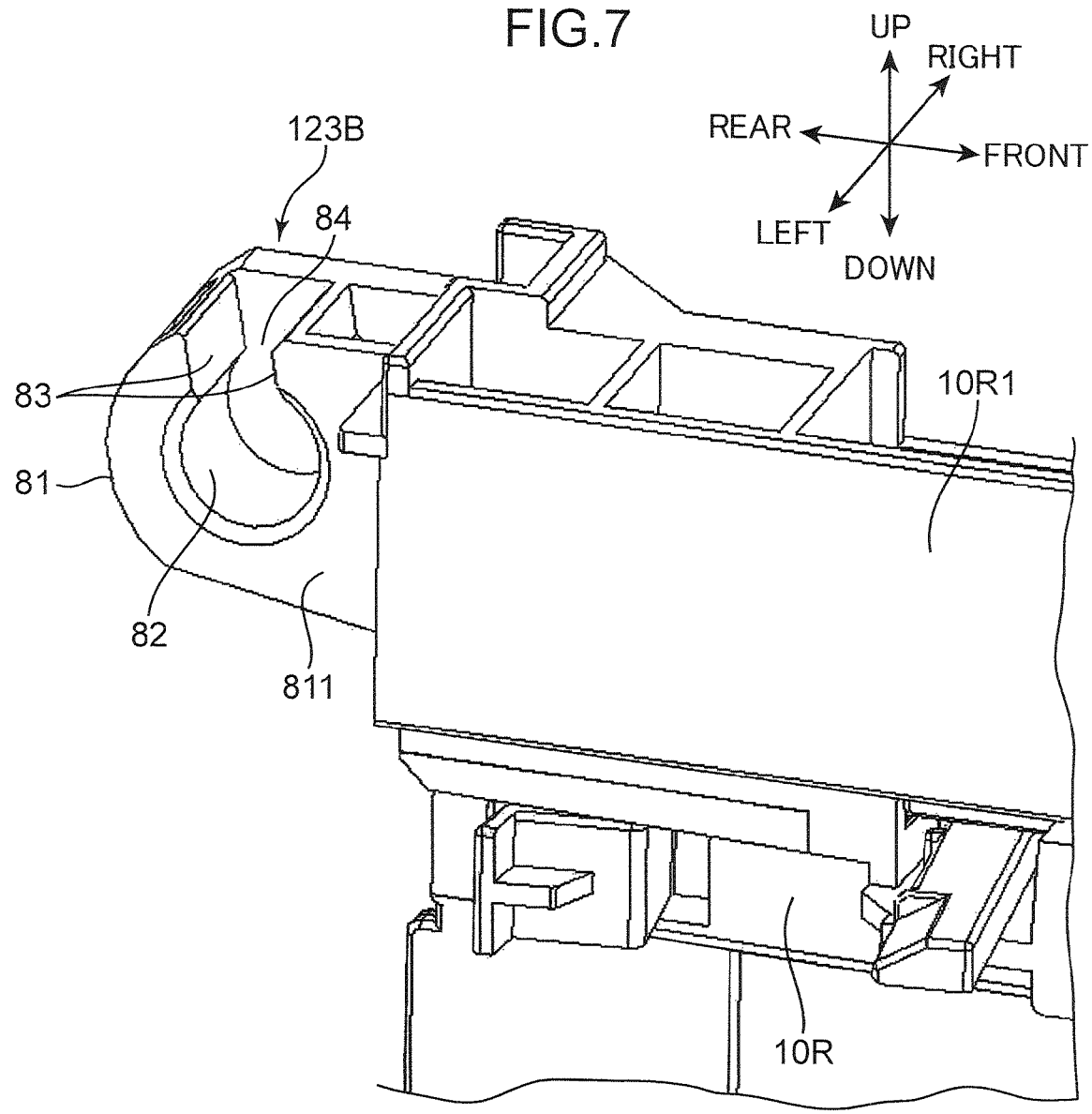
FIG. 7 is an enlarged view of the bearing section of the main body housing according to the embodiment of the present disclosure.
Figure 8:
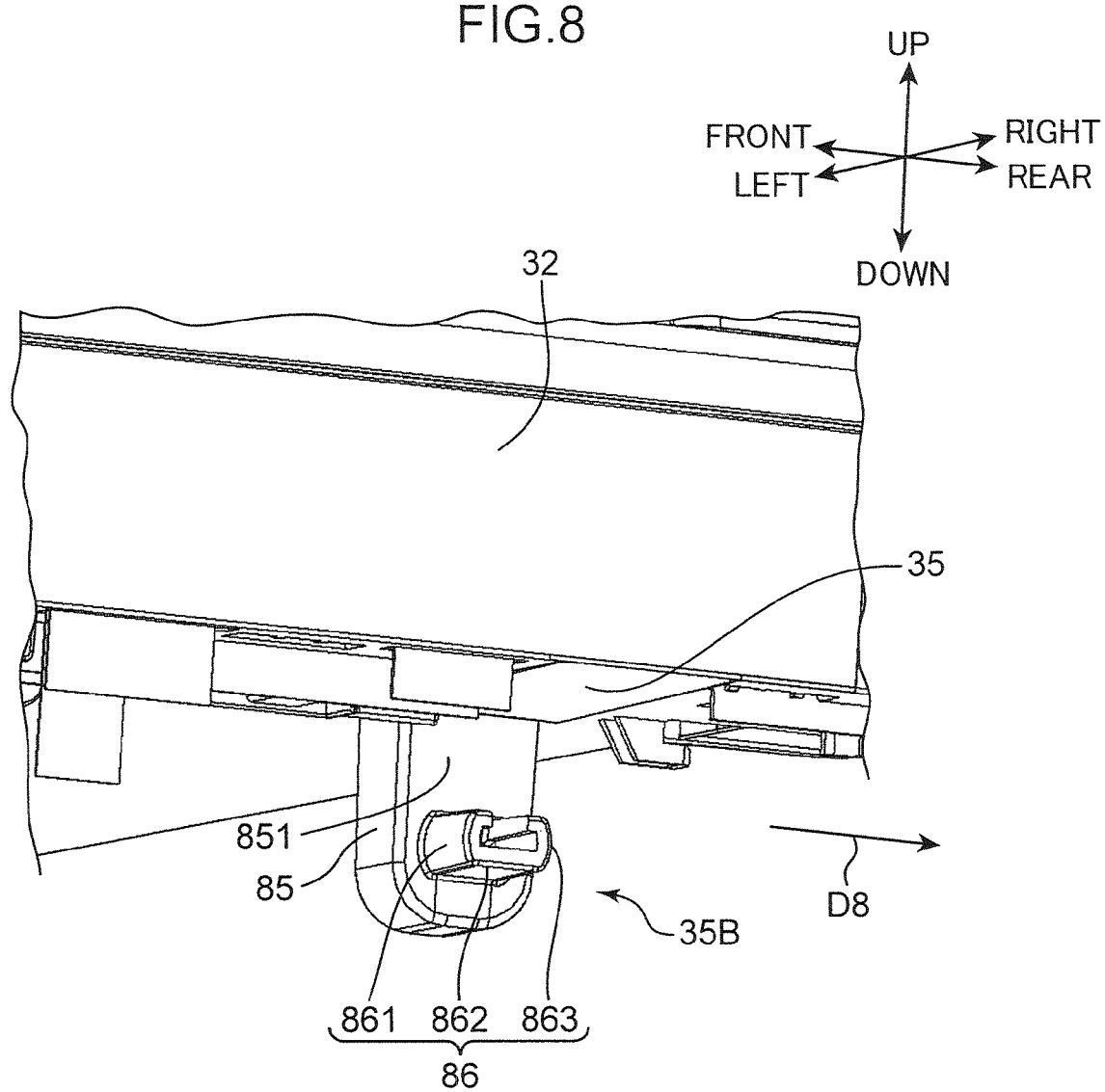
FIG. 8 is an enlarged view of the shaft section of the reading unit according to an embodiment of the present disclosure.
Figure 9:
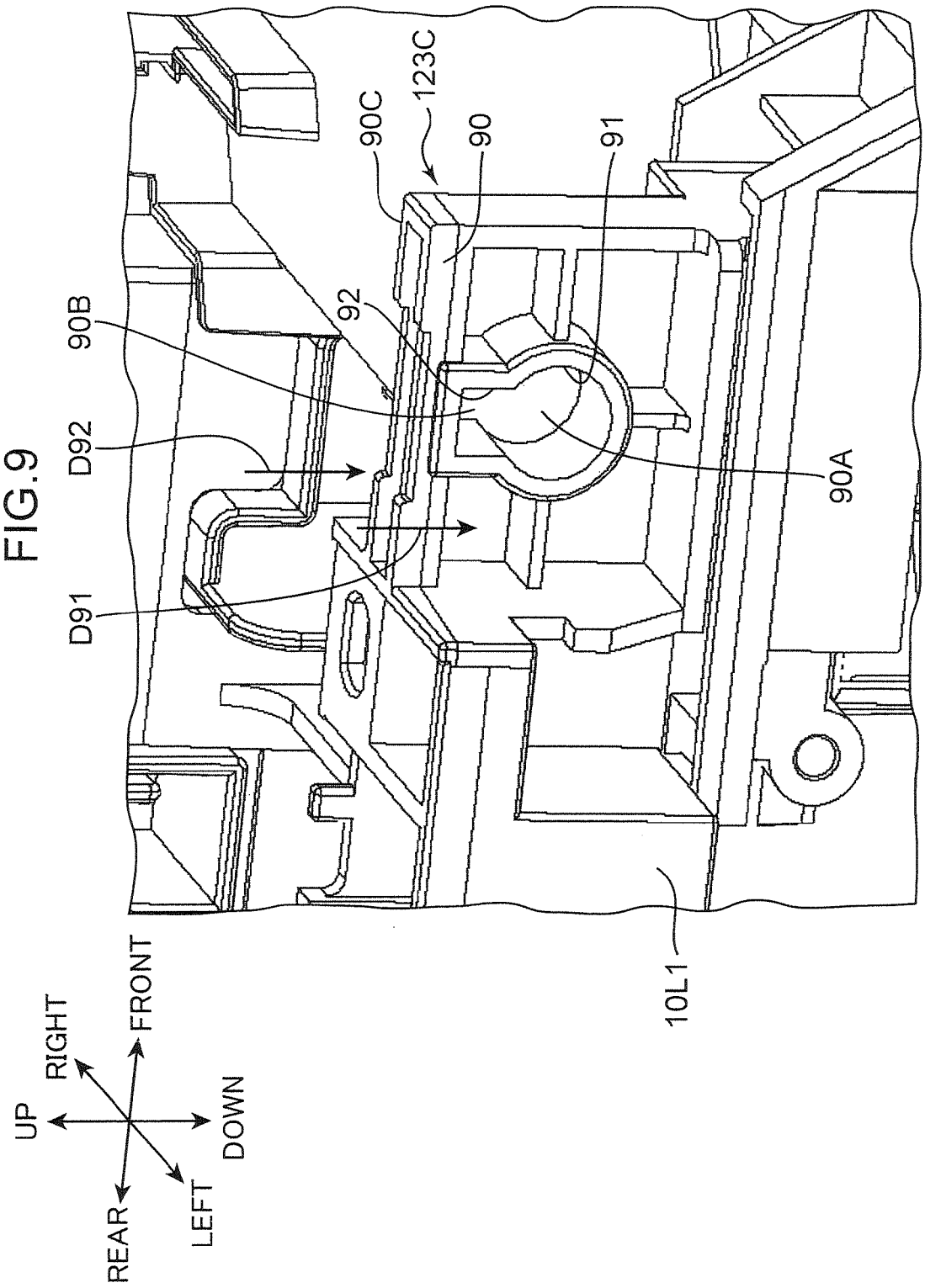
FIG. 9 is an enlarged view of a fixing section of the main body housing according to an embodiment of the present disclosure.
Figure 10:
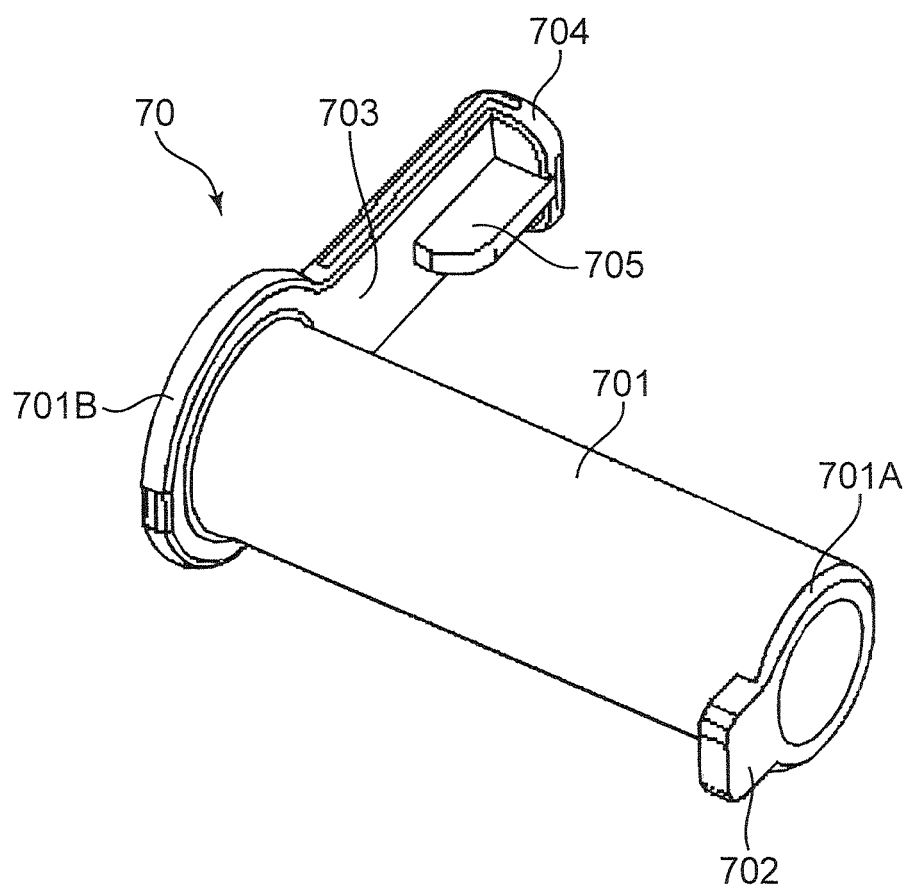
FIG. 10 is a perspective view of a fixing pin according to an embodiment of the present disclosure.

The structure in which the reading unit 3 is mounted on the main body housing 10 will be described below in greater detail with reference to FIGS. 5 to 10. FIG. 6 is a perspective view illustrating the state in which the front cover 11, left cover 12L, right cover 12R, and rear cover 12 are taken out from the image forming apparatus 1. Where the above-mentioned covers are taken out, the first bearing section 123A, second bearing section 123B (not shown in FIG. 6), first fixing section 123C, and second fixing section 123D are exposed. FIG. 7 is an enlarged perspective view of the second bearing section 123B of the main body frame 10A. FIG. 8 is an enlarged perspective view of the second shaft section 35B of the reading unit 3. FIG. 9 is an enlarged perspective view of the first fixing section 123C of the main body frame 10A, and FIG. 10 is a perspective drawing of a fixing pin 70 to be mounted on the first fixing section 123C.

The first shaft section 35A and the second shaft section 35B (FIG. 5) formed at the lower surface section 35 of the reading unit 3 are fitted into the first bearing section 123A and the second bearing section 123B (FIG. 4) of the main body frame 10A. Further, the first insertion section 35C and the second insertion section 35D are fitted into the first fixing section 123C and the second fixing section 123D, respectively, of the main body frame 10A, and the below-described fixing pin 70 (FIG. 10) is mounted. As a result, the reading unit 3 is mounted on the main body frame 10A, as shown in FIG. 6.

Referring to FIG. 7, the second bearing section 123B is provided with a bearing support section 81. The bearing support section 81 is provided to protrude rearward from the rear end section of the right fixing frame 10R1 (FIGS. 4 and 6). The bearing support section 81 is provided with a bearing inner wall 811. The bearing inner wall 811 is a wall section facing leftward. Further, the bearing support section 81 is provided with an inner tubular section 82 and a pair of notch surfaces 83. The inner tubular section 82 is a bearing orifice formed rightward from the central portion of the bearing inner wall 811. The notch surfaces 83 are a pair of wall sections formed by cutting upward the upper portion of the inner tubular section 82. A notch section 84 is formed by the pair of notch surfaces 83. The space above the bearing support section 81 and the inner tubular section 82 communicate with each other via the notch section 84.

Referring to FIG. 8, the second shaft section 35B is provided with a shaft support section 85 and a protruding shaft section 86. The shaft support section 85 is a protruding piece that protrudes downward from the lower surface section 35 of the reading section 32. The shaft support section 85 is provided with a support outer surface section 851. The support outer surface section 851 is a wall portion facing rightward of the shaft support section 85. The protruding shaft section 86 is provided to protrude rightward from the lower portion of the support outer surface section 851. The protruding shaft section 86 serves as a rotating shaft in rotation of the reading unit 3 with respect to the main body housing 10. The protruding shaft section 86 is provided with a first outer circumferential section 861, a flat section 862 (cut-out section), and a second outer circumferential section 863. The first outer circumferential section 861 and the second outer circumferential section 863 are circumferential surfaces positioned opposite each other on both sides of the rotating shaft which extends in the left-right direction, as a center. The flat section 862 connects together the lower end sections of the first outer circumferential section 861 and the second outer circumferential section 863. In other words, the protruding shaft section 86 is constituted by a substantially round columnar shape having the first outer circumferential section 861 and the second outer circumferential section 863 as parts of the circumferential surface, and the flat section 862 is formed by cutting part (lower end section) of the circumferential surface of the protruding shaft section 86 by a plane oriented along the lower surface section 35 of the reading section 32.

As described hereinabove, the protruding shaft section (the second shaft section 35B) is of a cylindrical shape and has a flat section 862 formed by cutting part of the circumferential surface of the protruding shaft section 86 by a plane oriented along the lower surface section 35 along the axial direction of the protruding shaft section 86. Meanwhile, the second bearing section 123B is of a cylindrical shape and has a notch section 84 obtained by cutting the outer circumferential section of the cylindrical shape in the up-down direction and provided along the axial direction of the protruding shaft section (second bearing section 123B) correspondingly to the smallest outer diameter section of the protruding shaft section 86 formed by the flat section 862, in a cross section orthogonal to the axial direction of the protruding shaft section 86 of the second shaft section 35B (cross section orthogonal to the axial direction of the cylindrical shape of the second bearing section 123B).

Referring to FIG. 9, the first fixing section 123C is provided with a fixing piece 90 (second protruding section). The fixing piece 90 is arranged at the front end section of the left fixing frame 10L1. The fixing piece 90 is a plate-shaped member provided to extend in the front-rear direction and disposed in a substantially central section of the width in the left-right direction of the left fixing frame 10L1. The fixing piece 90 protrudes from the upper surface section 10U of the main body housing 10 toward the lower surface section 35 of the reading section 32. A first abutment section 90C (abutment section) is disposed at the upper end of the fixing piece 90. The first abutment section 90C is an upper surface section of the fixing piece 90 and has a function of supporting the reading unit 3. Accordingly, the first abutment section 90C is disposed at the upper surface section 10U on a side closer to the reading section front wall 32A of the reading unit 3 than the first bearing section 123A and arranged to face the lower surface section 35 of the reading unit 3. The first abutment section 90C is disposed at one end side, in the direction along the reading section rear wall 32D, of the upper surface section 10U of the main body housing 10.

In the second fixing section 123D, a second abutment section 90D (FIG. 3) corresponding to the first abutment section 90C of the first fixing section 123C is disposed in a similar manner. The second abutment section 90D is disposed at the upper surface section 10U on a side closer to the reading section front wall 32A of the reading unit 3 than the second bearing section 123B and arranged to face the lower surface section 35 of the reading unit 3. The second abutment section 90D is disposed at other end side, in the direction along the reading section rear wall 32D, of the upper surface section 10U of the main body housing 10.

Further, the fixing piece 90 is provided with an inner circumferential section 91 and an insertion wall 92. The inner circumferential section 91 is an inner wall constituted by a circumferential surface extending in the left-right direction in a substantially central section of the fixing piece 90. A hole 90A passing through the fixing piece 90 in the left-right direction (in a direction along the lower surface section 35) is formed by the inner circumferential section 91. The insertion wall 92 is connected above the inner circumferential section 91. The insertion wall 92 is a pair of wall sections connected to the upper end side of the inner circumferential section 91. The upper end side of the hole 90A is opened upward by the insertion wall 92, thereby forming an insertion section 90B. A keyhole shape for inserting the below-described fixing pin 70 is formed by the hole 90A and the insertion section 90B.

Referring to FIG. 10, the fixing pin 70 is a fixing tool of a substantially round columnar shape. The fixing pin 70 is inserted into the first fixing section 123C and the first insertion section 35C when the reading unit 3 is mounted on the main body frame 10A. Further, the fixing pin 70 is inserted into the second fixing section 123D and the second insertion section 35D when the reading unit 3 is mounted on the main body frame 10A. The fixing pin 70 is provided with a pin main body section 701, an engagement piece 702, and a pin grasping section 703.

The pin main body section 701 is a main body portion of the fixing pin 70 and has a substantially round columnar shape. The engagement piece 702 is a protruding piece provided to protrude from a main body distal end section 701A on the distal end side of the pin main body section 701 in the diametrical direction of the pin main body section 701.

The pin grasping section 703 is provided to protrude from a main body proximal end section 701B on the side opposite to the main body distal end section 701A of the pin main body section 701 in the diametric direction of the pin main body section 701. The pin grasping section 703 is disposed on the side opposite to the engagement piece 702 in the circumferential direction of the pin main body section 701. The pin grasping section 703 is grasped by an assembly technician when the fixing pin 70 is inserted into the first fixing section 123C and the first insertion section 35C. A grasping distal end section 704 and a grasping support piece 705 are disposed at the distal end section of the pin grasping section 703. The grasping distal end section 704 is formed by bending the distal end side of the pin grasping section 703 at the main body distal end section 701A side. The grasping support piece 705 is disposed in the crossing section of the pin grasping section 703 and the grasping distal end section 704. The grasping support piece 705 is a rib member reinforcing the pin grasping section 703 and the grasping distal end section 704.

The first bearing section 123A and the first shaft section 35A have the shape and structure same as those of the second bearing section 123B and the second shaft section 35B. The process of assembling the reading unit 3 and the main body frame 10A by successively using the second bearing section 123B and the second shaft section 35B will be explained below.

When the reading unit 3 is mounted on the main body frame 10A, the second shaft section 35B of the reading unit 3 shown in FIG. 8 is inserted into the notch section 84 of the bearing support section 81 of the main body frame 10A in the direction shown by an arrow D8 (FIG. 7). In this case, the flat section 862 of the second shaft section 35B passes through the notch section 84, and the second shaft section 35B fits with the second bearing section 123B. Thus, when mounting is performed on the main body frame 10A, the assembly person mounts the reading unit 3 on the main body frame 10A in a posture such that the rear end side of the reading unit 3 faces down and the front end side of the reading unit 3 faces up. Where the projection shaft section 86 of the second shaft section 35B is inserted into the inner tubular section 82 of the second bearing section 123B, the assembly person moves the front end side of the reading unit 3 downward. In this case, the protruding shaft section 86 of the second shaft section 35B is rotated inside the bearing support section 81 of the second bearing section 123B. As a result of this rotation, the second outer circumferential section 863 of the second shaft section 35B is freed from the notch section 84 of the second bearing section 123B in the circumferential direction. Therefore, when the reading unit 3 is mounted on the main body frame 10A, the protruding shaft section 86 is prevented from separating from the second bearing section 123B.

Where the reading unit 3 is rotated about the second shaft section 35B as a center and the front end section of the reading unit 3 is moved downward, the first insertion section 35C (FIG. 5) is mounted on the first fixing section 123C of the left fixing frame 10L1. More specifically, the first insertion section 35C is mounted on the first fixing section 123C (arrows D91 and 92 in FIG. 9) so that the first protruding piece 351 and the second protruding piece 352 of the first insertion section 35C sandwich the fixing piece 90 of the first fixing section 123C in the left-right direction. In this case, the first abutting section 35X disposed between the first protruding piece 351 and the second protruding piece 352 of the first insertion section 35C abuts against the first abutment section 90C, which is the upper surface of the fixing piece 90. Likewise, the second abutting section 35Y (FIG. 5) of the second insertion section 35D abuts against the second abutment section 90D (FIG. 3) of the second fixing section 123D.

Thus, in the present embodiment, at the rear end side of the reading unit 3, the first shaft section 35A and the second shaft section 35B of the reading unit 3 are supported by the first bearing section 123A and the second bearing section 123B, respectively, of the main body frame 10A. At the front end side of the reading unit 3, the first abutting section 35X and the second abutting section 35Y of the reading unit 3 are supported by the first abutment section 90C and the second abutment section 90D of the main body frame 10A. In other words, the weight of the reading unit 3 causes the first abutting section 35X and the second abutting section 35Y of the reading unit 3 to abut against the first abutment section 90C and the second abutment section 90D of the main body frame 10A.

Further, the first abutting section 35X and the second abutting section 35Y of the reading unit 3 can abut against the first abutment section 90C and the second abutment section 90D of the main body frame 10A at the same time, but due to the tolerance of members constituting the reading unit 3 and the main body frame 10A, in some cases only one of the first abutting section 35X and the second abutting section 35Y abuts against the first abutment section 90C or the second abutment section 90D. In such cases, the other of the first abutting section 35X and the second abutting section 35Y is separated from the first abutment section 90C or the second abutment section 90D by a very small gap. In this case, the reading unit 3 is supported on the main body frame 10A in a total of three fulcrums obtained by adding one point of the first abutting section 35X or the second abutting section 35Y to the two points of the first shaft section 35A and the second shaft section 35B.

Referring to FIGS. 5 and 9, where the first abutting section 35X abuts against the first abutment section 90C, the first opening 353 and the second opening 354 of the first insertion section 35C are disposed to face the hole 90A of the first fixing section 123C. As a result, three openings are arranged adjacently in the order of the first opening 353, hole 90A, and second opening 354. The first opening 353 and the second opening 354 are open at a height larger than the height obtained by adding the heights of the hole 90A and the insertion section 90B of the fixing piece 90 in the up-down direction. The assembly person inserts the fixing pin 70 shown in FIG. 10 into the three openings from the left side of the first fixing section 123C. In this case, the fixing pin 70 is inserted such that the engagement piece 702 of the fixing pin 70 passes through the insertion section 90B of the fixing piece 90.

After the engagement piece 702 has passed through the second opening 354, the assembly person rotates the fixing pin 70 in the circumferential direction of the pin main body section 701. As a result, the grasping support piece 705 of the fixing pin 70 slides along the left side surface of the first protruding piece 351, and the engagement piece 702 of the fixing pin 70 slides along the right side surface of the second protruding piece 352. The first insertion section 35C and the first fixing section 123C are thus locked by the fixing pin 70. In the present embodiment, in a state in which the reading unit 3 is mounted on the main body frame 10A, the paper discharge unit 13 is disposed below the reading unit 3 (FIGS. 1 and 2). The paper discharge unit 13 is disposed at the upper surface section 10U of the main body frame 10A so as to face the lower surface section 35 of the reading unit 3. Further, a sheet is discharged by the paper discharge unit 13 in the direction from the reading section rear wall 32D toward the reading section front wall 32A. Therefore, when the user of the image forming apparatus 1 takes out the sheet discharged by the paper discharge unit 13, the user can come into contact with the lower surface section 35 of the reading section 32 of the reading unit 3. In this case, the fixing pin 70 also fixes the reading unit 3 and the main body frame 10A, thereby preventing the reading unit 3 from separating from the main body frame 10A.

Further, in a state in which the fixing pin 70 is mounted on the first insertion section 35C and the first fixing section 123C, the first opening 353 and the second opening 354 have an extra open portion below the fixing pin 70. In other words, the inner diameters of the first opening 353, the second opening 354, and the hole 90A of the fixing piece 90 and the outer diameter of the fixing pin 70 are set in advance such that the first opening 353, the second opening 354, and the hole 90A of the fixing piece 90 and the fixing pin 70 are clearance-fitted. Therefore, when the front end side of the reading unit 3 is lifted up in a state in which the front end side of the reading unit 3 abuts under gravity against the main body frame 10A, the reading unit 3 can move upward through the distance corresponding to the aforementioned extra open portion. Even in a state in which the fixing pin 70 fixes the reading unit 3 and the main body frame 10A, the below-described operation is provided by the clearance fitting.

Figure 11:
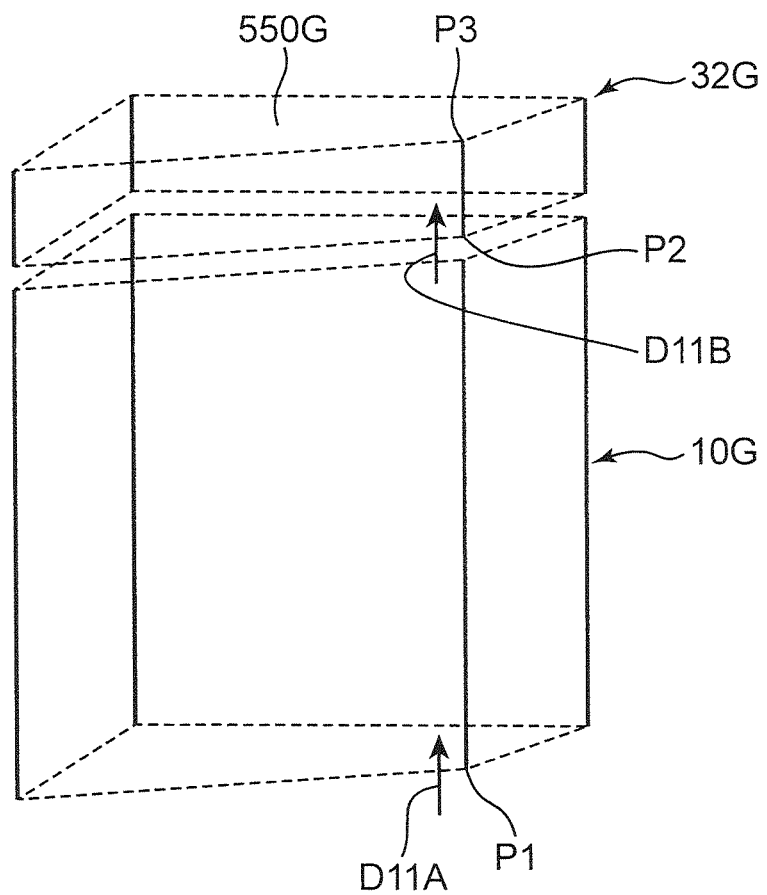
FIG. 11 is a schematic diagram for explaining the operation of an image forming apparatus to be compared with the present disclosure.

The operation of the image forming apparatus 1 according to the present embodiment will be explained below with reference to FIGS. 11 and 12. FIG. 11 is a schematic diagram for explaining the operation of an image forming apparatus to be compared with the present embodiment, and FIG. 12 is a schematic diagram for explaining the operation of the image forming apparatus 1 according to the present embodiment.

Referring to FIG. 11, in the image forming apparatus to be compared with the present embodiment, the reading section 32G is mounted above the main body housing 10G. The reading section 32G is fastened with screws or the like in four points on the front, rear, left, and right sides of the main body housing 10G, and the reading section 32G and the main body housing 10G are disposed integrally as a single rigid body on a floor surface. A platen 550G onto which a document is placed is disposed on the upper surface of the reading section 32G.

In this state, the main body housing 10G is disposed on the floor surface having peaks and valleys, and strains can be assumed to occur in the main body housing 10G. For example, one corner P1 among the corners constituting the lower end surface of the main body housing 10G is moved upward, as shown by an arrow D11A. As a result, one corner P2 constituting the lower end surface of the reading section 32G and one corner P3 constituting the upper end surface of the reading section 32G are also moved upward, following the movement of the corner P1 (arrow D11B). As a result, distortions are generated in the reading section 32G. Similar distortions also occur in the image that has been read by a reading device (not shown in the figures) that reads the document placed on the platen 550G. Where the main body housing 10G and the reading section 32G are thus fixed as a single rigid body, the distortions in the main body housing 10G cause defects in the image read by the reading section 32G.

Figure 12:
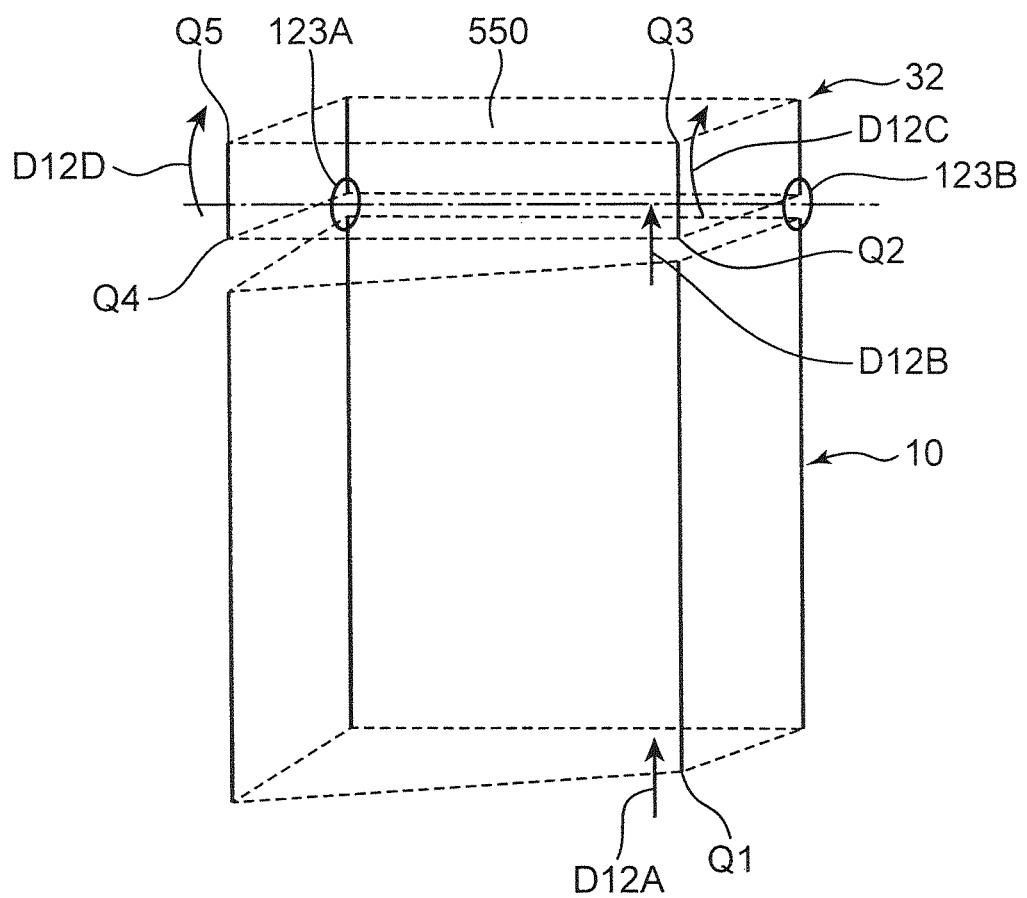
FIG. 12 is a schematic diagram for explaining the operation of an image forming apparatus according to an embodiment of the present disclosure.

By contrast, in the image forming apparatus 1 according to the present embodiment that is shown in FIG. 12, the distortions generated in the main body housing 10 are prevented from causing defects in the read-out image. Referring to FIG. 12, the reading section 32 (reading unit 3) is mounted on the main body housing 10, as described hereinabove. In this case, the reading section 32 is rotatably supported on the first bearing section 123A and the second bearing section 123B on the rear end side. The front end side of the reading section 32 is supported at the main body housing 10 (main body frame 10A) at a point Q4 and a point Q2 corresponding to the first insertion section 35C (first abutting section 35X) and the second insertion section 35D (second abutting section 35Y).

Let us assume that distortions have occurred in the main body housing 10 and the point Q1 of the lower end surface of the main body housing 10 has moved upward (arrow D12A). The distortions of the main body housing 10 are transmitted to the reading section 32, and the point Q2 on the lower end surface of the reading section 32 is moved upward (arrow D12B). In this case, in the reading section 32, the front end side of the reading section 32 is slightly moved upward, as shown by arrows D12D and D12C, following the rotation at the first bearing section 123A and the second bearing section 123B. Thus, the distortions of the main body housing 10 that have been transmitted to the point Q2 cause simultaneous upward movement of points Q5 and Q3 at the upper end surface of the reading section 32.

As a result, the front end edge of the reading section 32 only slightly moves upward, and the deformation of the reading section 32 is inhibited. Thus, in the image forming apparatus 1 according to the present embodiment, the distortions that have occurred in the main body housing 10 are prevented from being transmitted to the reading section 32. Therefore, no defects are caused in the read-out image of the document placed on the platen 550. Further, in the present embodiment, no external forces are applied in a concentrated manner to one corner of the reading section 32. Therefore, the application of external forces causing torsion to the read-out light source or image reading sensor (not shown in the figure) disposed inside the reading section 32 is reduced.

As indicated hereinabove, in the above-described embodiment, the image forming unit 300 is provided inside the main body housing 10. The reading section 32 (reading unit 3) is provided on the upper surface section 10U of the main body housing 10. The first shaft section 35A and the second shaft section 35B are disposed at either of the upper surface section 10U of the main body housing 10 and the lower surface section 35 of the reading section 32. The first bearing section 123A and the second bearing section 123B are provided on the other of the upper surface section 10U of the main body housing 10 and the lower surface section 35 of the reading section 32. The reading section is rotatably supported with respect to the upper surface section 10U of the main body housing 10, the reading section rear wall 32D side of the lower surface section 35 of the reading section 32 serving as a fulcrum, by inserting the first shaft section 35A and the second shaft section 35B into the first bearing section 123A and the second bearing section 123B. Meanwhile, the first abutting section 35X and the second abutting section 35Y disposed at the lower surface section 35 of the reading section 32, and the fixing piece 90C and the fixing piece 90D disposed at the upper surface section 10U of the main body housing 10 are provided on the reading section front wall 32A side of the lower surface section 35 of the reading section 32. The weight of the reading section 32 (reading unit 3) causes the first abutting section 35X and the second abutting section 35Y to abut against the fixing piece 90C and the fixing piece 90D. Therefore, even when the main body housing 10 has been disposed on the floor surface such that has convex and concave portions, and distortions have occurred in the main body housing 10, the reading section front wall 32A side of the reading section 32 can rotate in the up-down direction, the reading section rear wall 32D side of the reading unit 3 serving as a fulcrum. In this case, at the reading section front wall 32A side, the first abutting section 35X and the second abutting section 35Y abut by the weight thereof against the fixing piece 90C and the fixing piece 90D and therefore the distortions that have occurred in the main body housing 10 are not directly transmitted to the reading section 32. Therefore, the flatness of the platen 550 disposed in the reading section 32 is unlikely to degrade, and the read-out accuracy of the image of the document placed on the platen 550 is advantageously maintained.

Further, according to the above-described embodiment, a plurality of shaft sections and bearing sections are disposed along the reading section rear wall 32D. As a result, the reading section 32 is stably supported at the main body housing 10. Even if distortions occur in the main body housing 10, the first abutting section 35X or the second abutting section 35Y abuts against the fixing piece 90C or the fixing piece 90D, thereby maintaining the positioning of the reading section 32.

Further, according to the above-described embodiment, the fixing pin 70 is inserted into the first opening 353 of the first protruding piece 351 and the hole 90A of the fixing piece 90 in a state in which the reading section 32 is mounted on the main body housing 10 and the first abutting section 35X and the second abutting section 35Y abut against the fixing piece 90C and the fixing piece 90D. In this case, the outer diameter of the fixing pin 70 having a round columnar shape is set to be less than the inner diameter of the first opening 353 and the hole 90A in the up-down direction. Therefore, when the fixing pin 70 is inserted into the first opening 353 and the hole 90A, an extra open portion remains in the up-down direction. As a result, even when the reading section 32 is fixed to the main body housing 10 by the fixing pin 70, the reading section 32 can slightly move in the up-down direction with respect to the main body housing 10. Therefore, even when distortions occur in the main body housing 10, the strains are prevented from being directly transmitted to the reading section 32.

Further, according to the above-described embodiment, when the reading section 32 is fixed to the main body housing 10, the first protruding piece 351 and the second protruding piece 352 are disposed to sandwich the fixing piece 90. Therefore, the reading section 32 is unlikely to shift, and the reading section 32 is stably supported by the main body housing 10.

Further, according to the above-described embodiment, the paper discharge unit 13 discharging the sheets in the direction from the reading section rear wall 32D to the reading section front wall 32A is disposed at the upper surface section 10U of the main body housing 10. The paper discharge unit 13 is disposed to face the lower surface section 35 of the reading section 32. The user of the image forming apparatus 1 sometimes touches the periphery of the reading section front wall 32A of the lower surface section 35 of the reading section 32 when taking out the sheet discharged by the paper discharge unit 13. Even in such a case, the fixing pin 70 fixes the reading section 32 and the main body housing 10, thereby preventing the reading section 32 from separating from the main body housing 10.

The image forming apparatus 1 according to the embodiment of the present disclosure is explained above, but the present disclosure is not limited thereto and, for example, the following modifications thereof can be made.

(1) In the above-described embodiment, the configuration is explained in which the first insertion section 35C and the second insertion section 35D disposed at the front end side of the reading unit 3 are fixed to the first fixing section 123C and the second fixing section 123D of the main body frame 10A, but the present disclosure is not limited to such a configuration. Thus, a configuration may be used in which the reading unit 3 is not provided with the fixing pin 70, and the first abutting section 35X and the second abutting section 35Y abut against the first abutment section 90C and the second abutment section 90D of the main body frame 10A by the weight of the reading unit 3. Further, the configuration in which the reading unit 3 is locked to the main body frame 10A is not limited to the above-described configuration, and the image forming apparatus 1 may be also provided with another lock mechanism.

(2) In the above-described embodiment, the configuration is explained in which the first shaft section 35A and the second shaft section 35B serving as shaft sections are disposed at the rear end side of the reading unit 3, but the present disclosure is not limited to this configuration. Thus, the rotatable shaft section may be disposed along any one side, from among the sides of the lower surface section 35 of the reading unit 3, and the reading unit 3 may abut by the weight thereof against the main body frame 10A at the other side that is opposite the aforementioned one side.

(3) In the above-described embodiment, the configuration is explained in which the first shaft section 35A and the second shaft section 35B are disposed at the lower surface section 35 of the reading section 32, and the first bearing section 123A and the second bearing section 123B are disposed at the main body frame 10A, but the present disclosure is not limited to such configuration. Thus, a configuration may be used in which the first shaft section 35A and the second shaft section 35B are disposed at the left fixing frame 10L1 and the right fixing frame 10R1 of the main body frame 10A, and the first bearing section 123A and the second bearing section 123B are disposed at the lower surface section 35 of the reading section 32.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. An image forming apparatus comprising:
a housing provided with an upper surface section;
an image forming unit that is provided inside the housing and forms an image on a sheet;
an image reading section that has a first wall, a second wall on a side opposite to the first wall, a bottom surface connecting the first wall and the second wall, and a platen disposed above the bottom surface and used for placing a document, the image reading section being mounted on the upper surface section of the housing and reading a document image of the document;
shaft sections provided at the bottom surface of the image reading section or the upper surface section of the housing and extending in a direction along the first wall, the shaft sections include a first shaft section disposed at one end side, in the direction alone the first wall, of the bottom surface or the upper surface section, and a second shaft section disposed at the other end side, in that direction, of the bottom surface or the upper surface section;
bearing sections provided at a surface, from among the bottom surface of the image reading section and the upper surface section of the housing, other than a surface where the shaft sections are provided, the bearing sections include a first bearing section into which the first shaft sections is inserted and a second bearing section into which the second shaft section is inserted, the bearing sections supporting the shaft sections so that the image reading section can be rotated with respect to the upper surface section of the housing;
abutment sections that are disposed at the upper surface section of the housing on a side closer to the second wall than the shaft sections or the bearing sections, and are arranged to face the bottom surface of the image reading section; and
abutting sections that are disposed at the bottom surface of the image reading section on a side closer to the second wall than the shaft sections or the bearing sections and are caused by the weight of the image reading section to abut against the abutment sections.

2. The image forming apparatus according to claim 1, wherein
the abutment sections include a first abutment section disposed at one end side, in the direction along the first wall, of the upper surface section of the housing, and a second abutment section disposed at the other end side, in that direction, of the upper surface section of the housing; and
the abutting sections include a first abutting section that is disposed at one end side, in the direction along the first wall, of the bottom surface of the image reading section and abuts against the first abutment section, and a second abutting section that is disposed at the other end side, in that direction, of the bottom surface of the image reading section and abuts against the second abutment section.

3. An image forming apparatus comprising:
a housing provided with an upper surface section;
an image forming unit that is provided inside the housing and forms an image on a sheet;
an image reading section that has a first wall, a second wall on a side opposite to the first wall, a bottom surface connecting the first wall and the second wall, and a platen disposed above the bottom surface and used for placing a document, the image reading section being mounted on the upper surface section of the housing and reading a document image of the document;
shaft sections provided at the bottom surface of the image reading section or the upper surface section of the housing and extending in a direction along the first wall;
bearing sections provided at a surface, from among the bottom surface of the image reading section and the upper surface section of the housing, other than a surface where the shaft sections are provided, the bearing sections having the shaft sections inserted therein and supporting the shaft sections so that the image reading section can be rotated with respect to the upper surface section of the housing;
abutment sections that are disposed at the upper surface section of the housing on a side closer to the second wall than the shaft sections or the bearing sections, and are arranged to face the bottom surface of the image reading section; and
abutting sections that are disposed at the bottom surface of the image reading section on a side closer to the second wall than the shaft sections or the bearing sections and are caused by the weight of the image reading section to abut against the abutment sections
a first protruding section provided to protrude from the bottom surface of the image reading section on a side closer to the second wall than the shaft sections or the bearing sections, toward the upper surface section of the housing;
a first hole formed in the first protruding section so as to pass through in a direction along the bottom surface;

a second protruding section provided to protrude from the upper surface section of the housing on a side closer to the second wall than the shaft sections or the bearing sections toward the bottom surface of the image reading section, and disposed to face the first protruding section;

a second hole formed in the second protruding section so as to face the first hole and pass through in the direction along the bottom surface; and a fixing pin having a round columnar shape and an outer diameter less than the inner diameter of the first hole and the second hole in an up-down direction, inserted into the first hole and the second hole in a state in which the abutting sections abut against the abutment sections, and fixing the image reading section to the housing.

4. The image forming apparatus according to claim 3, further comprising:

a third protruding section provided to protrude from the bottom surface of the image reading section on a side closer to the second wall than the shaft sections or the bearing sections toward the upper surface section, and disposed at a distance from the first protruding section, such that the second protruding section is sandwiched between the first protruding section and the third protruding section; and a third hole formed in the third protruding section so as to face the second hole and pass through in the direction along the bottom surface; wherein the fixing pin is inserted into the first hole, the second hole and the third hole in a state in which the abutting sections abut against the abutment sections, and fixes the image reading section to the housing.

5. The image forming apparatus according to claim 3, further comprising:

a paper discharge unit that is disposed at the upper surface section of the housing so as to face the bottom surface of the image reading section, and discharges a sheet on which an image has been formed in the image forming unit, in a direction from the first wall toward the second wall.

6. The image forming apparatus according to claim 1, wherein the shaft section is of a substantially round columnar shape having a circumferential surface and has a cut-out section obtained by cutting out part of the circumferential surface by a plane oriented along the bottom surface of the image reading section;

the bearing section is of a cylindrical shape and has a notch section obtained by cutting an outer circumferential section of the cylindrical shape in an up-down direction and provided along an axial direction of the cylindrical shape correspondingly to a smallest outer diameter section of the shaft section formed by the cut-out section, in a cross section orthogonal to the axial direction; and the cut-out section passes through the notch section, and the shaft section is fitted in the bearing section, whereby the image reading section is mounted on the housing.

7. The image forming apparatus according to claim 3, wherein the inner diameter of the first hole and the second hole and an outer diameter of the fixing pin are set such that the first hole, the second hole, and the fixing pin are clearance-fitted in a state in which the abutting sections abut against the abutment sections.

* * * * *